United States Patent [19]

Gallucci

[11] Patent Number: 4,839,426

[45] Date of Patent: Jun. 13, 1989

[54] MISCIBLIZING BLENDS OF POLYCARBONATE AND STYRENE COPOLYMERS

[75] Inventor: Robert R. Gallucci, Mt. Vernon, Ind.

[73] Assignee: General Electric Company, Mt. Vernon, Ind.

[21] Appl. No.: 83,116

[22] Filed: Aug. 10, 1987

[51] Int. Cl.$^4$ ............................................. C08L 69/00
[52] U.S. Cl. ................................ 525/146; 525/67; 525/147; 525/148
[58] Field of Search ............... 525/147, 146, 148, 67, 525/439, 468; 528/204

[56] References Cited

U.S. PATENT DOCUMENTS 4,511,693  4/1985  Fox et al. ............................... 525/67
4,665,122  5/1987  Robeson et al. ..................... 524/504

Primary Examiner—Theodore E. Pertilla
Attorney, Agent, or Firm—Martin B. Barancik; Joseph T. Eisele

[57] ABSTRACT

Blends of polycarbonate resins with styrene-acrylonitrile types of copolymers are rendered miscible by the presence of a polysulfone-carbonate resin.

16 Claims, 1 Drawing Sheet

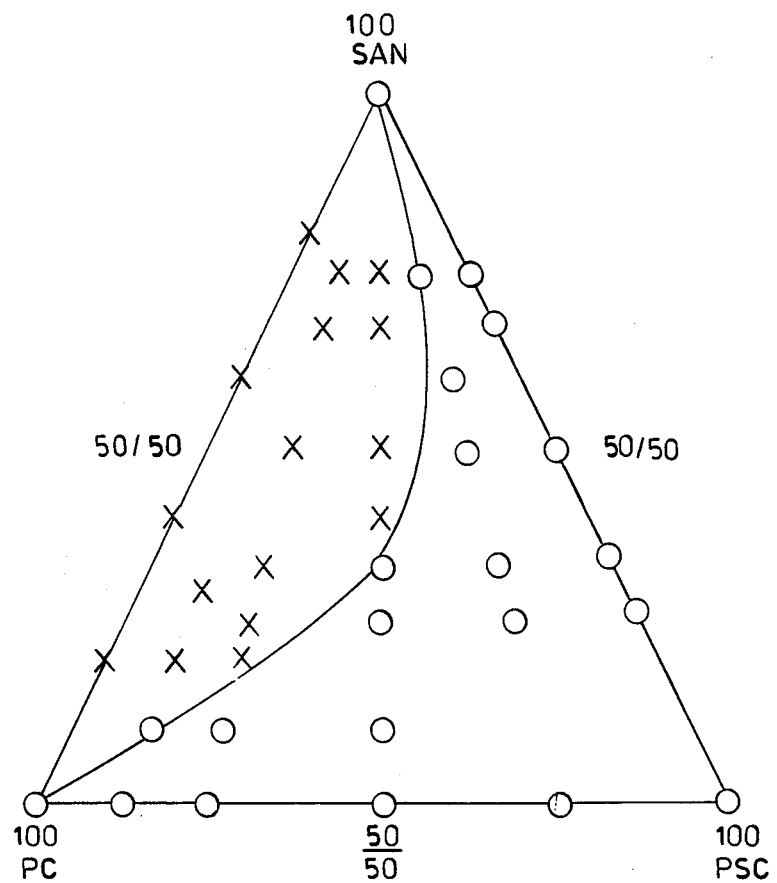

MISCIBLIZING BLENDS OF POLYCARBONATE AND STYRENE COPOLYMERS

BACKGROUND OF THE INVENTION

1. Field of the Invention

The invention relates to thermoplastic molding compositions of an aromatic polycarbonate and a styrene-acrylonitrile copolymer.

2. Brief Description of the Prior Art

Blended compositions of a polycarbonate and a thermoplastic styrene-acrylonitrile copolymer have been described in the prior art literature; see for example the description in the U.S. Pat. No. 4,172,103. However, these blends as molding compositions produce articles of relatively poor elastic modulus. It is theorized that the inferior elastic modulus may be due to a phase incompatibility of the component resins. Certainly it is well known that blends of styrene-acrylonitrile and polycarbonate resins are not miscible as evidenced by their exhibiting two glass transition temperatures; see J. Appl. Polymer Sci. 29, 3131 (1984).

When blends of two different polymers exhibit a single glass transition temperature ($T_g$), it generally signifies the resin components are compatible. However, a single $T_g$ is not a necessary condition for a compatible blend.

It was previously known that blends of styrene-acrylonitrile copolymers in admixture with polysulfone-carbonate resins exhibited a single $T_g$ and were miscible polymers; see U.S. Pat. No. 4,511,693. However, it was not previously appreciated that the polysulfone-carbonate copolymers functioned in some way to render miscible, blends of otherwise immiscible polymer resins.

When used herein and in the appended claims, "miscibility" refers to blends or compositions of polymers in which the component polymers do not undergo phase separation, thus helping to avoid stratification of the components during or after processing. "Miscibility" is of great significance for an admixture of different resins, because it ensures homogeneity, and a unity of properties, which greatly facilitates subsequent processing and use of the composition. Incompatible blends separate into phases containing predominantly their own separate components, and thus may be considered to be immiscible. This characteristic, combined with the often low physical attraction forces across the phase boundaries, usually causes immiscible/incompatible blend systems to have poor mechanical properties, thus preventing the preparation of polymer blends useful for a number of applications.

SUMMARY OF THE INVENTION

The invention comprises a thermoplastic molding composition, which comprises;
- a polycarbonate resin of a non-dihydric phenol sulfone;
- a thermoplastic copolymer of a styrene type of monomer with an acrylonitrile type of monomer; and
- a misciblizing proportion of a polysulfone-carbonate copolymer.

The compositions of the invention are ternary blends characterized in part by miscibility of the polymer components in a single phase. The compositions are useful to thermoplastically mold articles such as films and parts for laminate sheets, automotive body parts and like constructions requiring homogenous polymer blends. The compositions are also useful in solvent casting procedures.

BRIEF DESCRIPTION OF THE DRAWING

The accompanying drawing is a graphical representation of the ternary blends of the invention in terms of the compositional make-up and miscibility of components.

DETAILED DESCRIPTION OF THE PREFERRED EMBODIMENTS OF THE INVENTION

Polycarbonate (PC) resins for use herein are generally well known and may be prepared by reacting a dihydric phenol with a carbonate precursor, such as phosgene, a haloformate or a carbonate ester. Generally speaking, such carbonate polymers may be typified as possessing recurring structural units of the formula:

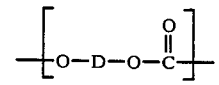

wherein D is a divalent aromatic radical, residue of the dihydric phenol employed in the polymerization reaction. Preferably, the carbonate polymers used as blend ingredients to provide the resinous compositions of the invention have an intrinsic viscosity (as measured in methylene chloride at 25° C.) ranging from about 0.30 to about 1.40 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis-(4-hydroxyphenyl) propane and a carbonate precursor.

The aromatic polycarbonates may be manufactured by known processes, such as the methods set forth in U.S. Pat. Nos. 4,018,750 and 4,123,436 where a dihydric phenol is reacted with a carbonate precursor; or by transesterification processes such as are disclosed in U.S. Pat. No. 3,154,008, as well as other processes known to those skilled in the art.

Included within the term "polycarbonates", for the purposes of this invention are the poly(ester-carbonate) resins. These resins may generally be described as polymers comprising recurring carbonate groups,

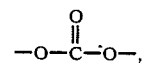

carboxylate groups,

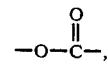

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) polymers, in general, are prepared by reacting an aromatic difunctional carboxylic acid or ester forming derivative, a dihydric phenol and a carbonate precursor.

The preparation of poly(ester-carbonates) which may be employed in the compositions of the present invention is described in U.S. Pat. Nos. 3,030,331; 3,169,121; 3,207,814; 4,194,038 and 4,156,069 incorporated herein by reference.

The poly(ester-carbonates) which are preferred include the aromatic poly(ester-carbonates) derived from dihydric phenols, aromatic dicarboxylic acids or their reactive ester forming derivatives such as the aromatic diacid halides, and phosgene. A particularly useful class of aromatic poly(ester-carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(ester-carbonate) is generally from about 25 to 90 mole percent and preferably about 35 to 80 mole percent. The molar range of terephthalate units, with the remainder of the copolymer ester units preferably comprising isophthalate units, is generally from about 2 to about 90 percent, and preferably from about 5 to about 50 percent.

Typical dihydric phenols useful in formulating the polycarbonate resins, as described above, may be represented by the general formula:

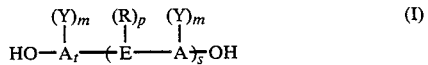

in which A is an aromatic group such as phenylene, biphenylene, naphthylene, anthrylene, etc. E may be an alkylene or alkylidene group such as isopropylidene, butylene, butylidene, isobutylidene, amylene, isoamylene, amylidene, isoamylidene, and generally from one to twelve carbon atoms, inclusive. Where E is an alkylene or alkylidene group, it may also consist of two or more alkylene or alkylidene groups, connected by a non-alkylene or non-alkylidene groups, such as an aromatic linkage, a tertiary amino linkage, an ether linkage, a carbonyl linkage, or by a direct bond. In addition, E may be a cycloaliphatic group of five to twelve carbon atoms, inclusive (e.g. cyclopentyl, cyclohexyl), or a cycloalkylidene of five to twelve carbon atoms, inclusive, such as cyclohexylidene. Other groups which E may represent will occur to those skilled in the art. R is hydrogen or a monovalent hydrocarbon group such as alkyl of one to eight carbon atoms, inclusive (methyl, ethyl, propyl); aryl (phenyl, naphthyl); aralkyl (benzyl, ethylphenyl); or cycloaliphatic of five to twelve carbon atoms, inclusive (cyclopentyl, cyclohexyl). Y may be an inorganic atom such as chlorine, bromine, fluorine, etc; an organic group such as the nitro group or a nitrile group; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one; and s is any whole number from and including zero to twenty.

In the typical dihydric phenol compound represented by Formula I above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted wth Y and a hydroxyl group.

Examples of dihydric phenol compounds that may be employed in the above polymers include:
2,2-bis-(4-hydroxyphenyl)propane, or (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
1,1-bis-(4-hydroxyphenyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexymethane;
1,2-bis-(4-hydroxyphenyl)-1,2-bis-(phenyl)propane;
2,2-bis-(4-hydroxyphenyl)-1-phenylpropane; and the like.

Also included are dihydroxybenzenes typified by hydroquinone and resorcinol; dihydroxydiphenyls such as 4,4'-dihydroxydiphenyl; 2,2'-dihydroxydiphenyl; 2,4'-dihydroxydiphenyl; dihydroxy-naphthalenes such as 2,6-dihydroxynaphthalene.

Dihydroxy aromatic ethers such as those described in U.S. Pat. No. 3,148,172 are also useful as the dihydric phenol. The dihydroxy aromatic ethers may be prepared as described in U.S. Pat. No. 2,739,171. Illustrative of such compounds are the following:
4,4'-dihydroxydiphenyl ether;
4,4'-dihydroxytriphenyl ether;
the 4,3'-, 4,2'-, 4,1'-, 2,2'-, 2,3'-dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl-2,2'-ether;
4,4'-dihydroxypentaphenyl ether;
4,4'-dihydroxy-2,6-dimethoxydiphenyl ether; and
4,4-dihydroxy-2,5-diethoxydiphenyl ether.

Mixtures of the dihydric phenols can also be employed, and where dihydric phenol is mentioned herein, mixtures of such materials are considered to be included. Other dihydric phenols which are suitable are disclosed in U.S. Pat. Nos. 2,999,835; 3,028,365; 3,334,154; 4,131,575.

The carbonate precursor used above to produce the polycarbonate resins may be either a carbonyl halide, a carbonate ester, or a haloformate. The carbonyl halides which can be employed herein are carbonyl chlorides or bromides. Typical of the carbonate esters are diphenyl carbonate, di(halophenyl)carbonates such as di(chlorophenyl)carbonate, di(bromophenyl)carbonate, di(trichlorophenyl)carbonate, di(tribromophenyl)carbonate, di(alkylphenyl)carbonate such as di(tolyl)carbonate, phenyltolyl carbonate, chloronaphthyl chlorophenyl carbonate, and the like. The haloformates suitable for use herein include bishaloformates of dihydric phenols such as bischloroformates of hydroquinone, or bischloroformates of bisphenol-A. While other carbonate precursors will occur to those skilled in the art, carbonyl chloride, also know as phosgene, is preferred.

The aromatic difunctional carboxylic acids suitable for poly(ester-carbonates) producing may be represented by the general formula:

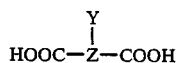
(II)

wherein Z represents an aromatic radical such as phenylene, naphthylene, biphenylene or substituted phenylene; two or more aromatic groups connected through non-aromatic linkages such as those defined by E in Formula I; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by Formula II, Z is an aromatic radical such as phenylene, biphenylene, naphthylene or substituted phenylene. Some nonlimiting examples of suitable aromatic dicarboxylic acids which may be used in preparing the poly(ester-carbonate) of the instant invention include phthalic acid, isophthalic acid, terephthalic acid, homophthalic acid, o-, m-, and p-phenylenediacetic acid, and the polynuclear aromatic acids such as diphenyl dicarboxylic acids, and isomeric naphthalene dicarboxylic acids, and isomeric naphthalene dicarboxylic acids. The aromatics may be substituted with Y groups in the same manner as the Formula I aromatics described above are substituted. Of course, these acids may be used individually or a mixtures of two or more different acids.

The copolymers of a styrene type of monomer and an acrylonitrile type of monomer employed as components of resin blends of the invention include those sometimes referred to in the art as "SAN types of polymers". The "SAN types of Polymers" are a wide variety of polymers, the molecules of which contain two or more monomeric parts that are copolymerized. One monomer or group of monomers that may be co-polymerized and referred to above as styrene types of monomer are monovinylaromatic hydrocarbons. The monovinylaromatic monomers may be generically described by the formula:

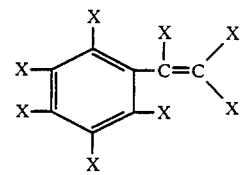

wherein X is selected from the group consisting of hydrogen, alkyl of 1–5 carbon atoms, chlorine or bromine. Examples of the monovinylaromatic compounds and alkyl-, cycloalkyl-, aryl-, alkaryl-, aralkyl-, alkoxy-, aryloxy-, and other substituted vinylaromatic compounds include styrene, 4-methylstyrene; 3,5-diethylstyrene, 4-n-propylstyrene, α-methylstyrene, α-methyl vinyltoluene, β-chlorostyrene, β-bromostyrene, dichlorostyrene, dibromostyrene, tetra-chlorostyrene, mixtures thereof, and the like. The preferred monovinylaromatic hydrocarbons used are styrene and/or α-methylstyrene and p-methylstyrene.

The second group of monomers, i.e.; the acrylonitrile type that may be polymerized in preparing the SAN type of copolymer are acrylic monomers such as acrylonitrile, substituted acrylonitrile, and/or minor amounts of acrylic acid esters, or methyl acrylic esters exemplified by alkyl acrylates such as methyl methacrylate.

The acrylonitrile and substituted acrylonitriles, are described generically by the formula:

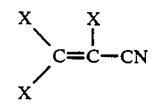

wherein X is as previously defined. Examples of such monomers include ethacrylonitrile, methacrylonitrile, α-chloroacrylonitrile, β-chloroacrylonitrile, α-bromoacrylonitrile, and β-bromoacrylonitrile.

The most preferred SAN copolymers employed in the blends of the invention contain 20–35 percent acrylonitrile segments (by weight) and 80–65% styrene or alkyl-substituted styrene or mixtures thereof, segments (by weight).

The SAN copolymers may be impact-modified by addition or copolymerization with butadiene, acrylate or ethylene-propylene types of rubbers. The use of impact-modified SAN copolymers will result in polycarbonate-polysulfone carbonate-SAN blends of the invention with a separate rubbery phase which will improve overall impact strength of articles molded from the blend. More specific examples of impact modified SAN types of copolymers found advantageous in preparing the blends of the invention are:
1. acrylonitrile-butadiene-styrene (ABS);
2. acrylate-styrene-acrylonitrile (AAS) or (ASA); and
3. olefin-styrene-acrylonitrile (AOS), (OSA) or (AES)

these impact-modified copolymers may be made by blending or grafting technology well known to those skilled in the art.

The SAN copolymer is optionally prepared by polymerizing a conjugated diene, such as butadiene or a conjugated diene with a monomer copolymerizable therewith, such as styrene, to provide a polymeric backbone. After formation of the backbone, at least one grafting monomer, and preferably two, such as the styrene type of monomer and/or the acrylonitrile type of monomer described above are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like. The specific conjugated diene monomers normally utilized in preparing the backbone of the graft polymer are generically described by the formula:

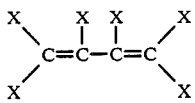

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

In the preparation of the preferred graft copolymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

In preparing the impact-modified SAN polymer, it is normal to have a certain percentage of the polymerizing monomers that are grafted on the backbone combine with each other and occur as a free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene-acrylonitrile copolymer. Also, there are occasions where a copolymer, such as α-methylstyrene-acrylonitrile, is added to the graft polymer copolymer blend. When a graft is the polymer-copolymer blend referred to herein, it is meant optionally to include at least one copolymer blended with the graft polymer composition and which may contain up to 90% of free copolymer.

Optionally, the elastomeric backbone of the graft copolymers may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer. These resins are well known in the art and many are commercially available. The elastomeric backbone of the graft copolymer may also optionally be an ethylene-propylene or ethylene-propylenediene rubber.

Blends of polycarbonate and styrene-acrylonitrile (SAN) types of copolymers are generally obtainable in all proportions relative to each other and are not completely miscible. Consequently, blends having a ratio of styrene-acrylonitrile type polymer to polycarbonate in the range of 1:100 to 100:1 are within the scope of this invention. By controlling the proportions of the SAN copolymer and polycarbonate relative to each other, blends having certain properties may be readily obtained. Generally, preferred compositions of the invention have ratios of 10:90 to 90:10. The miscibility modifiers (polysulfone-carbonate) employed in the present invention are added in a miscibilizing proportion. A miscibilizing proportion will vary, depending on the relative proportions of polycarbonate resin and SAN copolymer present. In general, as the proportion of SAN copolymer increases, a miscibilizing proportion will also increase, but not in a linear fashion as will be seen hereinafter.

The polysulfone-carbonate (PSC) copolymer miscibilizers employed in the compositions of the invention are generally known as are the methods of their preparation. Preferred polysulfone-carbonates are prepared by the method described in U.S. Pat. No. 3,737,409; see also "Polysulfone Carbonate Polymers" by Fox et al., 43rd S.P.E. ANTEC 85, 951, both of which are incorporated herein by reference thereto. The polysulfone carbonates may be prepared by polymerization of a sulfone containing bis phenol with a carbonate precursor. The sulfone groups may be direct linkages between phenol units or they may be pendant side groups of the bis phenol. The sulfone containing bis phenols may be polymerized singly or in combination with each other and a carbonate precursor. The sulfone containing bis phenols may also be polymerized with non-sulfone containing bis phenols. In general, the polysulfone-carbonate copolymers are prepared by interfacial polymerization, in which a rapidly stirred two phase mixture of aqueous caustic, polymer solvent, bis phenol(s), a phase transfer catalyst, and monofunctonal chain terminator is phosgenated. The growing polymer dissolves in polymer solvent, unreacted bisphenols dissolve in the aqueous caustic phase and the polymer forms at the interface. The polymer is isolated by precipitation in methanol and dried. The applicable technology of the synthesis of polycarbonates is described in "Chemistry and Physics of Polycarbonates" by H. Schnell (Interscience, 1964). Sulfone containing bis phenols and their polymers with carbonate precursors can also be prepared by oxidation of sulfide or sulfoxide containing monomers or polymers. Polysulfone-carbonate copolymers preferred as components of the blends of the invention may be prepared by the reaction of dixylenolsulfone [preferably bis-(3,5-dimethyl-4-hydroxyphenyl) sulfone] and/or bis phenol-A (BPA) with phosgene. Generally the amount of dixylenolsulfone employed is equal to or greater than the amount of BPA (on a molar basis). The effectiveness of the polysulfone-carbonate copolymer in compatibilizing polycarbonate-SAN blends will increase with its increasing dixylenolsulfone content. In any given blend of the invention, higher overall ratios of sulfone containing bis phenols to other bis phenols will provide a polysulfone-carbonate copolymer which favors formation of miscible blends.

The compositions of the invention may contain other ingredients commonly employed in molding compositions to improve particular physical properties or processability such as stabilizers, flame retardants, mold release agents, foaming agents, reinforcing agents, pigments, and other thermoplastic resins such as rubbery impact-modifiers polyethers, polyolefins and the like. In addition, the compositions of the invention may include fillers and reinforcing fibers such as, for example, glass and carbon. The fillers may include, for example, silica, talc, clay, mica, calcium sulfate and calcium carbonate. The amount of additive present is dependent upon the desired effect and it is within the knowledge of those skilled in the art to determine the appropriate amounts.

Compounding of the blends of the invention may be accomplished by any conventional blending technique such as, for example, melt blending, dry blending, solution blending and the like. Melt blending may be accomplished in a conventional extruder, from which the admixture may be molded into a part of specific dimensions or further extruded to obtain a film or sheet product.

The following examples and preparations describe the manner and process of making and using the invention and set forth the best mode contemplated by the inventor of carrying out the invention but are not to be construed as limiting the invention. Where reported, the following tests were carried out.

Glass Transition Temperature

The glass transition temperatures were determined by using a Perkin-Elmer DSC-2B instrument which measures the glass transition temperature or $T_g$ by differential scanning calorimetry.

Intrinsic Viscosity

The intrinsic viscosity was measured at a temperature of 25° C. in chloroform and is reported in deciliters/gram (dl/g).

EXAMPLES 1-22

A series of ternary blends were prepared by blending various proportions of an aromatic polycarbonate (PC) which is LEXAN® available from General Electric Company, Mt. Vernon, Ind. having an intrinsic viscosity of 0.54 dl/g; a styrene-acrylonitrile copolymer (SAN) which is LUSTRAN® 33 having an intrinsic viscosity of 0.54 dl/g (Monsanto Chemical Co.) and a polysulfone-carbonate (PSC) which is a 1:1 molar copolymer of bisphenol A, dixylenolsulfone and phosgene.

The blends were prepared by completely dissolving the appropriate ingredients in chloroform and casting a polymeric film by evaporation of solvent. After drying under vacuum, the specimens were examined to determine the glass transition temperature of each composition. The results are shown in Table I, below.

TABLE I

| | TERNARY BLENDS | | | | |
|---|---|---|---|---|---|
| Exp't | SAN | PSC | PC | Tg °C. | |
| 1 | 75 | 13 | 13 | 114 AND | 143 |
| 2 | 67 | 17 | 17 | 110 | 134 |
| 3 | 50 | 25 | 25 | 116 | 134 |
| 4 | 33 | 33 | 33 | 133 | — |
| 5 | 25 | 38 | 38 | 135 | — |
| 6 | 75 | 6 | 19 | 105 | 130 |
| 7 | 67 | 8 | 25 | 109 | 132 |
| 8 | 50 | 13 | 38 | 110 | 134 |
| 9 | 33 | 17 | 50 | 118 | 138 |
| 10 | 25 | 19 | 56 | 122 | 140 |
| 11 | 10 | 22 | 68 | 148 | — |
| 12 | 20 | 20 | 60 | 126 | 149 |
| 13 | 40 | 30 | 30 | 121 | 148 |
| 14 | 10 | 45 | 45 | 153 | — |

TABLE I-continued

| | TERNARY BLENDS | | | | |
|---|---|---|---|---|---|
| Exp't | SAN | PSC | PC | Tg °C. | |
| 15 | 75 | 19 | 6 | 113 | — |
| 16 | 67 | 25 | 8 | 117 | — |
| 17 | 50 | 38 | 12 | 125 | — |
| 18 | 40 | 45 | 15 | 126 | — |
| 19 | 25 | 56 | 19 | 153 | — |
| 20 | 10 | 12 | 78 | 148 | — |
| 21 | 20 | 10 | 70 | 117 | 143 |
| 22 | 30 | 9 | 61 | 112 | 141 |

EXAMPLES 23-34

The Examples 23-34 are not examples of the invention but are made for purposes of comparison.

The procedure of Examples 1-22, supra., is repeated, except that blends of only 1 or 2 polymer components in various proportions are made. The compositions and the glass transitions temperatures are given in Table II, below.

TABLE II

| | BINARY BLENDS | | | |
|---|---|---|---|---|
| Exp't | SAN | PSC | PC | Tg °C. |
| 23 | 100 | — | — | 102 |
| 24 | 75 | 25 | — | 112 |
| 25 | 67 | 33 | — | 113 |
| 26 | 50 | 50 | — | 126 |
| 27 | 33 | 67 | — | 141 |
| 28 | 25 | 75 | — | 155 |
| 29 | — | 100 | — | 200 |
| 30 | — | — | 100 | 147 |
| 31 | — | 13 | 87 | 151 |
| 32 | — | 25 | 75 | 153 |
| 33 | — | 50 | 50 | 155 |
| 34 | — | 75 | 25 | 162 |
| 35 | 20 | — | 80 | 106 and 145 |
| 36 | 40 | — | 60 | 107 and 144 |
| 37 | 60 | — | 40 | 105 and 145 |
| 38 | 80 | — | 20 | 107 and 143 |

The date set forth in the Tables I and II above has been plotted graphically in the accompanying drawing. With reference to the drawing, it may be observed that the horizontal axis shows the ratio (wt. %) of PC to PSC. The vertical axis shows increasing amounts of SAN. The edges of the triangle are binary blends. The points of the triangle are single materials. With reference to the Tables I and II, it will be seen from the drawing that polycarbonate resin is completely miscible with polysulfone-carbonate resin in all proportions, as is polysulfone-carbonate blends with styrene-acrylonitrile resin. However, the polycarbonate and styrene-acrylonitrile binary blends are only partially miscible in any proportions, unless polysulfone-carbonate is added as a miscibilizer. Miscibility is then achieved, depending on the proportions (weight percent) of the components in the ternary blend.

The optimum proportions for one to achieve miscible blends of the polymers will vary with specific structures of the three polymeric ingredients employed. Generally polysulfone-carbonate polymers with higher levels of sulfone will favor formation of the desired miscible blends.

In blends using SAN copolymers with an acrylonitrile content of from 23 to 32 percent [by weight] and polycarbonate prepared from BPA and phosgene and a polysulfone-carbonate prepared from equal molar amounts of dixylenolsulfone and BPA; miscible blends are achieved in the proportions shown in the accompanying drawing. For example, a 75:25 PSC/PC by weight mixture will form a miscible blend with up to 75 parts (by weight) of SAN. A 50:50 PSC/PC mixture will form a miscible blend with up to 35 parts (by weight) of SAN. A 25:75 PSC/PC mixture will form a miscible blend with up to 17 parts (by weight) of SAN. Approximately 10 parts (by weight) or less of SAN will form a miscible blend with a mixture of 13:87 parts of PSC/PC (by weight).

What is claimed is:

1. A thermoplastic molding composition, which comprises;
   a miscible blend of
   from 25 to 87 parts by weight of a polycarbonate resin of a non-dihydric phenol sulfone;
   from 10 to 75 parts by weight of a thermoplastic copolymer of a styrenic monomer with acrylonitrile monomer having from 20 to 35 percent acrylonitrile segments; and
   a miscibilizing proportion of a polysulfonecarbonate copolymer.

2. The composition of claim 1 wherein the styrene-acrylonitrile copolymer has from 23 to 32 percent of acrylonitrile segments and the composition is made up of 75 parts by weight polysulfone-carbonate, 25 parts by weight polycarbonate and up to 75 parts by weight of styrene-acrylonitrile copolymer.

3. The composition of claim 1 wherein the styrene-acrylonitrile copolymer has from 23 to 32 percent of acrylonitrile segments and its composition is made up of 50 parts by weight of polysulfone-carbonate, 50 parts by weight of polycarbonate and up to 35 parts by weight of the styrene-acrylonitrile copolymer.

4. The composition of claim 1 wherein the styrene-acrylonitrile copolymer has from 23 to 32 percent of acrylonitrile segments and the composition is made up of 25 parts by weight of the polysulfone-carbonate, 75 parts by weight of polycarbonate and up to 17 parts by weight of the styrene-acrylonitrile copolymer.

5. The composition of claim 1 wherein styrene-acrylonitrile copolymer has from 23 to 32 percent of acrylonitrile segments and the composition is made up of 13 parts by weight of polysulfone-carbonate, 87 parts by weight of the polycarbonate and up to 10 parts by weight of the styrene-acrylonitrile copolymer.

6. The composition of claim 1 wherein the styrene acrylonitrile copolymer has from 23 to 32 percent of acrylonitrile segments and its composition is made up of from 13 to 75 parts by weight of the polysulfone-carbonate, from 25 to 87 parts by weight of the polycarbonate and from 10 to 75 parts by weight of the styrene-acrylonitrile copolymer.

7. The composition of claim 1 wherein the styrenic monomer is a compound of the formula:

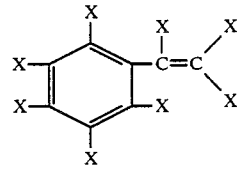

wherein X is selected from the group consisting of hydrogen or alkyl of from 1 to 5 carbon atoms, inclusive; and the acrylonitrile monomer is of the formula:

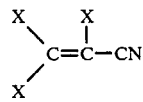

wherein X is as defined above.

8. The composition of claim 7 wherein the polycarbonate is the homopolymer of 2,2-bis(hydroxyphenyl)-propane and phosgene.

9. The composition of claim 8 wherein the thermoplastic copolymer is styrene-acrylonitrile.

10. The composition of claim 9 wherein the styrene-acrylonitrile copolymer is acrylonitrile-butadiene-styrene.

11. The composition of claim 9 wherein the styrene-acrylonitrile copolymer is acrylate-styrene-acrylonitrile.

12. The composition of claim 9 wherein its styrene-acrylonitrile copolymer is olefin-styrene-acrylonitrile.

13. The composition of claim 1 wherein the polysulfone-carbonate copolymer is the copolymer of bisphenol A and dixylenolsulfone and phosgene.

14. The composition of claim 1 wherein the polysulfone-carbonate copolymer is the copolymer of a 1 or more: 1 ratio of dixylenolsulfone to bisphenol-A.

15. The composition of claim 14 wherein the ratio is 1:1.

16. An article molded from the composition of claim 1.

* * * * *